May 31, 1938.   W. A. MORRIS   2,119,342
HEATPROOF SERVICE TRAY
Filed Sept. 21, 1937

INVENTOR
Walter A. Morris
BY
ATTORNEYS

Patented May 31, 1938

2,119,342

UNITED STATES PATENT OFFICE 2,119,342

HEATPROOF SERVICE TRAY

Walter A. Morris, Meriden, Conn., assignor to Steelsmiths, Inc., Meriden, Conn., a corporation of Connecticut Application September 21, 1937, Serial No. 164,859

7 Claims. (Cl. 65—61)

This invention relates to heat proof service trays and particularly trays made of plastic material.

The object of the invention is a novel tray of the above indicated character which is capable of receiving a cooking or baking dish directly from a flame or out of an oven without being burned or unduly heated by the dish, and particularly such a tray which is characterized by its high resistance to the passage of heat from the dish to the table or other surface upon which the tray rests.

Other objects of the invention will hereinafter appear.

For a better understanding of the invention and its objects, reference may be had to the accompanying drawing forming a part of this application wherein—

Figure 1:
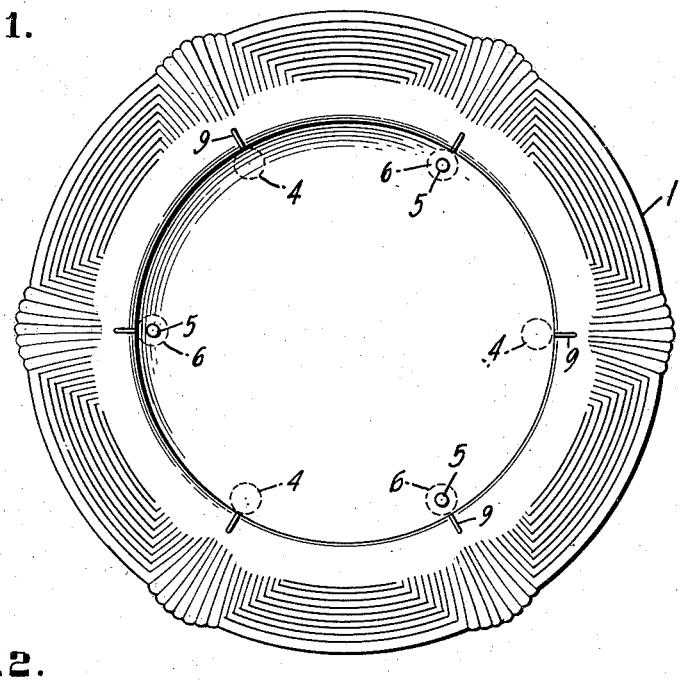
Fig. 1 illustrates a plan view of a tray embodying the invention.
Figure 2:
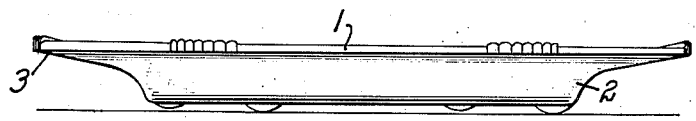
Fig. 2 is a side view thereof.

Referring to the drawing I have illustrated the invention as embodied in a tray 1, being in the particular embodiment shown of plate-like form and having a main body part 2 and a rim or border part 3. The tray may be made of any suitable material but is preferably made of a plastic heat resisting and insulating material and of a character to resist deformation under normal service conditions.

The bottom 7 of the tray is provided around the periphery thereof with alternating bosses or knobs 4 on the bottom and metallic inserts or pins 5 on the interior thereof. The bosses 4 are formed as a part of the body of plastic material and the metallic inserts may be of any suitable metal, as for example of stainless steel. These metallic inserts 5 are supported and fastened in corresponding recesses formed on the interior surface of the bottom of the tray and these recesses extend down into bosses 6 which are also formed as a part of the bottom 7 of the tray and are of shallower depth than the bosses or knobs 4. The latter form a multi-point support for the tray upon the supporting surface or table 8. The metallic inserts 5 extend, as indicated, above the interior surface of the bottom 7 to function as supports for a cooking or baking dish which is just removed from the fire or heating apparatus. The peripheral edge of the body part 2 of the plastic tray is provided with elongated bosses or ridges 9 preferably of the same plastic material of which the tray is made and formed integrally therewith. In the particular embodiment shown the ridges or elongated bosses 9 are positioned adjacent the bosses 4 and inserts 5, and also in the particular embodiment shown there are three bosses or knobs 4, and three metallic inserts 5 mounted in the shallow bosses 6, alternating with each other as shown.

Figure 3:
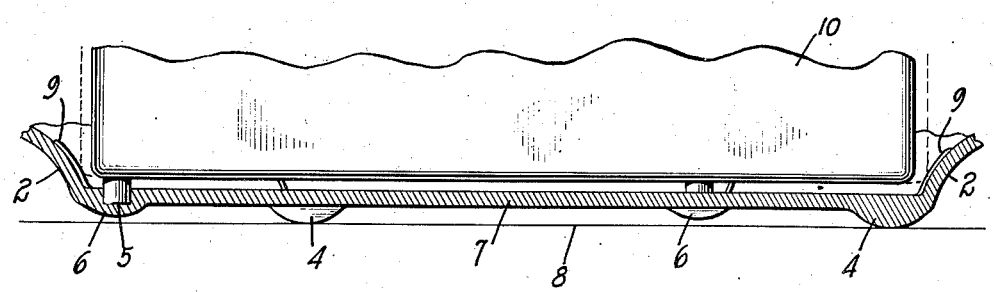
Fig. 3 is a sectional view with certain parts broken away.

A cooking or baking dish 10 is indicated in Fig. 3 as resting upon the inserted upwardly-projecting pins 5. These metallic inserts absorb the first shock of the cooking dish 10 which has just been removed from a flame or out of an oven and they also keep the hot dish from resting directly upon the bottom 7 of the plastic tray and form an air chamber underneath to permit the flow of air between the bottom 7 and the cooking dish. The ridges or elongated radially disposed bosses 9 which are disposed on the side walls of the interior of the tray co-operate functionally with the inserts by preventing the cooking dish from making a solid extended contact on any one side of the tray, thus always providing for a flow of air both around the sides of the cooking dish and over the bottom 7 and underneath the cooking dish. The knobs or bosses 4 act as feet for affording a multiple point support for the tray and are peripherally spaced from the knobs or bosses 6 which contain the metallic inserts 5, thus assuring the knobs or bosses 4 which rest on the dining-room table or other surface from ever getting hot. In the particular embodiment shown the bosses or knobs 4 are placed at one-sixth the circumference from the inserts 5 and knobs or bosses 6. A plastic tray of this construction is not only safe from injury by heat from the cooking dish placed therein, but also insulates against the passage of heat from the cooking dish to the table or other supporting surface 8.

The tray may be made of any suitable plastic material, as for example a urea type of material (Plaskon, Beetle ware) or a phenolic type of material (Textolite, Bakelite).

I claim:

1. A heat proof service tray formed of plastic heat insulating material having integral bosses formed therein and on the bottom thereof, certain of said bosses forming a multiple point support for the tray and certain other of the bosses being spaced from the first named bosses and being of shallower depth to avoid contact with the supporting surface, said second named bosses having recesses therein with metallic inserts therein extending above the interior surface of the bottom of the tray and a plurality of ridges on the side walls thereof extending down to at least approximately the level of the upper surfaces of the inserts, said metallic inserts and ridges co-operating to support a cooking dish out of contact with the bottom of the tray and out of contact with the sides of the tray between the ridges to form a free air circulating chamber entirely about the bottom and sides of the cooking dish, with the tray bottom resisting the passage of heat between the spaced inserts and the first named bosses which are spaced therefrom.

2. In a tray of the character set forth in claim 1 wherein the first named bosses are disposed peripherally about the bottom of the tray.

3. In a tray of the character set forth in claim 1 wherein the second named bosses with the metallic inserts therein are disposed peripherally about the bottom of the tray.

4. In a tray of the character set forth in claim 1 wherein the tray bottom is circular, with the bosses disposed circumferentially thereof, and there are at least three of each of both sets of the first named and second named bosses, with the first named bosses alternating with and circumferentially spaced substantially midway between said second named bosses.

5. In a tray of the character set forth in claim 1 wherein the tray bottom is circular, with the bosses disposed circumferentially thereof, and there are at least three of each of both sets of the first named and second named bosses, with the first named bosses alternating with and circumferentially spaced substantially midway between said second named bosses, with the ridges on the sides being disposed adjacent the positions of the second named bosses.

6. A heat proof service tray formed of plastic heat insulating material having integral bosses formed on the bottom thereof and forming a multi-point support for the tray, and a multiplicity of metallic inserts extending above the surface of the bottom of said tray, each of said inserts being spaced peripherally of the tray from the supporting bosses, and spacing ridges also formed integrally with the plate and on the side walls thereof and extending down to at least approximately the level of the upper surfaces of the inserts.

7. A heat proof service tray formed of plastic heat insulating material having integral bosses formed therein and projecting from the bottom surface thereof, certain of said bosses forming a multiple point support for the tray and certain other of the bosses being spaced from the first named bosses and being of shallower depth to avoid contact with the supporting surface, the tray bottom having formed on the upper surface thereof recesses at the points where the last named bosses are formed, and metallic inserts disposed in said recesses and extending above the interior surface of the bottom of the tray.

WALTER A. MORRIS.